May 5, 1964  H. B. COLE  3,131,596
OPTICAL PRINTING METHOD AND APPARATUS THEREFOR
Filed April 21, 1961  3 Sheets-Sheet 1

INVENTOR
HENRY B. COLE
BY
*Louis L. Gagnon*
ATTORNEY

May 5, 1964 H. B. COLE 3,131,596
OPTICAL PRINTING METHOD AND APPARATUS THEREFOR
Filed April 21, 1961 3 Sheets-Sheet 2

INVENTOR
HENRY B. COLE
BY
Louis L. Gagnon
ATTORNEY

United States Patent Office 3,131,596
Patented May 5, 1964

3,131,596
OPTICAL PRINTING METHOD AND
APPARATUS THEREFOR
Henry B. Cole, East Woodstock, Conn., assignor to
American Optical Company, Southbridge, Mass., a
voluntary association of Massachusetts
Filed Apr. 21, 1961, Ser. No. 104,703
7 Claims. (Cl. 88—24)

This invention relates to optical printers and has particular reference to the provision of an improved optical printer and method of making the same wherein distortions of a controlled character may be introduced into the printed image in a more simple and efficient manner.

The present invention is a continuation in part of application Serial No. 601,741 filed August 2, 1956, now abandoned, and relates to optical printing techniques, such as shown and described in Patent No. 2,868,070 issued January 13, 1959 to Brian O'Brien, Jr. et al. and Patent No. 2,792,746 issued May 21, 1957 to Brian O'Brien. The invention deals particularly with the problem of correcting for so-called keystone, barrel and droop or sag distortions during the printing of positive picture images onto a positive film from negative picture images on a negative film. By the term "printing" of positive picture images on positive films from negative picture images on negative films, it is meant that this invention will deal only with the exposing of a positive film to image forming light produced by illuminating the negative film. The negative film will be considered to be fully processed and the positive film in a condition to be sensitive to image forming light received thereby. This invention will not deal with the processing of films to develop and fix the picture images thereon which result from exposure of the films to image forming light. The processing of the films is accomplished conventionally and is not relevant to this invention. The printing heretofore has been accomplished by passing light through a narrow slit across the negative film and imaging said light by means of a curved field lens onto the positive film. The positive film is curved in a direction transversely thereof to match the field curvature of the lens. As the negative and positive films move past the slit and printing line respectively, a print is made from the negative film onto the positive film. The controlled distortions set forth above are introduced into the positive film image, particularly the corrections for keystone and barrel distortions by introducing varying amounts of magnification and minification into portions of the image as the negative image is moved across the slit; and the correction for droop or sag is introduced into the positive image by the related transverse curving of the positive film and by controlling the angle of the light rays directed onto said curved film. The varying amounts of magnification and minification are introduced by shifting the curved field lens controlled amounts longitudinally of the optical axis thereof during the printing operation and as the slit scans the negative image.

Although such printing arrangements have proven quite satisfactory from the viewpoint of introducing the above desired image distortional corrections into the positive image, the transverse curving of the film, particularly the positive film, has introduced problems such, for example, as nonuniform stretching of the film resulting from having to position the film advancing sprocket at a considerable distance from the film supporting shoe, which distance is dependent upon the fact that the film has to move from its position of curvature over the shoe to a relatively flat position when traveling over the film advancing sprocket and the distance of travel of the film must be such as to make this possible. The curving of the film is brought about by forming the shoe to the transverse curvature desired and by using vacuum to suck the film down to the shape of the shoe during the advancing of the film thereover. Another problem is that because of the transverse curving of the film, difficulty has been encountered in maintaining lateral steadiness in the film during the advancing thereof. This is due primarily to the fact that the curving of the film causes it to have less stiffness in a sidewise direction and renders it more susceptible to unsteadiness and so called "breathing" wherein it tends to periodically lift slightly away from the shoe during its travel thereover. Another problem is that of scratching the back of the film as it is moved over the shoe as it has to have a relatively intimate contact therewith in order to be drawn to the curved shape by the action of vacuum. Also in printing systems of the above-mentioned type wherein the positive film is exposed by directing image forming light obliquely thereonto, a loss in intensity of the image forming light which is to expose the positive film results from portions of said light being reflected from the film surface. The extent of light loss in this respect is, of course, dependent upon the angle of incidence. Projection along an axis substantially normal to the film surface will avoid such light loss.

It, therefore, is one of the primary objects of the present invention to provide a simple, efficient and economical optical printing system and method of introducing image correction distortions of the above character into the positive film image with maximum optical efficiency and without requiring transverse curving of the positive film thereby enabling the film advancing sprocket to be placed nearer the film supporting shoe to provide more uniform control of the film with a minimum of stretching thereof.

Another object is to provide an arrangement wherein the negative and positive films are both held substantially flat in transverse meridians during printing and are, therefore, more positively retained in proper positional relation with each other at all times during the printing operation.

Another object is to provide an arrangement for obviating the danger of scratching either side of the picture containing areas of both the negative and positive films during the printing operation.

Another object is to provide a printing arrangement of the above character wherein image forming light rays are directed onto the positive film along paths approximately normal to the plane of the film with the result of providing more efficient use of the light with substantially no reflection thereof from the positive film surface receiving the same and substantially no image distortion resulting from breathing of the film which might result during the advancing thereof.

Another object is to provide a printing arrangement of the above character wherein the size of image projected onto the positive film may be magnified or minified thereby permitting films of different desired widths to be used.

Another object is to provide a novel printing arrangement and method of making the same wherein greater flexibility is afforded as to the related angular dispositions of the negative and positive films in order to obtain best end results as to certain of said correction distortions which are desired in the positive film image.

Other objects and advantages of the invention will become apparent from the following description taken in connection with the accompanying drawings wherein.

Figure 1:
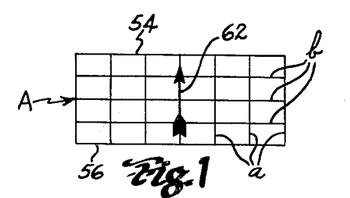
FIG. 1 is a face view of an object configuration which is filmed and printed in accordance with this invention.

The corrections referred to as for keystone, barrel and droop or sag distortions might best be understood by reference to an object A to be photographed such as diagrammatically shown in FIG. 1. This object, for illustration, comprises a plurality of equally spaced vertical lines "a" and a plurality of equally spaced horizontal lines "b."

According to the teachings of the O'Brien et al. Patent No. 2,868,070 previously referred to, the camera lens for photographing said object is of the wide angle type and its characteristics are such as to introduce in the photographed image, as shown diagrammatically in FIG. 2, controlled progressively increasing lateral compressions in the image along the horizontal axis from the center and toward the opposite sides thereof. These progressively increasing compressions of image are adapted to compensate for similar progressively increasing elongations of image which takes place when said image is subsequently projected onto a screen of a controlled concave cylindrical curvature. The compressions of the image as produced during photographing and the elongations of the image as produced by the screen are such as to cooperatively produce a substantially distortionless image along the horizontal axis thereof as viewed on the screen from a preselected point in the audience area.

Figure 2:
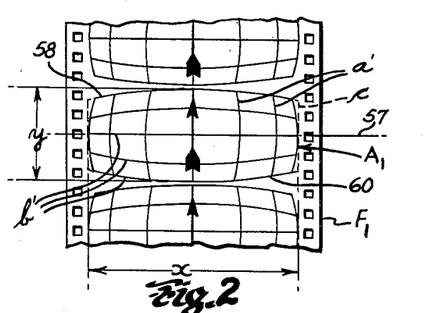
FIG. 2 is a fragmentary diagrammatic face view of a negative film bearing a photographed image of said object.

While the above desired result is obtained, certain undesired curvatures of image or barrel distortions are introduced in said image, as diagrammatically illustrated by the curving of the vertical lines $a'$ in FIG. 2. A feature of the present invention is to straighten said lines during the printing of the image on a positive film as diagrammatically shown by the dash lines $c$.

If the image is projected onto the curved screen at an angle from above or below the center line of the screen, errors designated as keystone and droop or sag will appear in the screen image and it is another feature of the present invention to correct for such errors by introducing in the positive film image, controlled keystone and droop or sag distortions opposite to those which would otherwise appear on the screen and in amounts sufficient to rectify such errors in the screen image.

Figure 3:
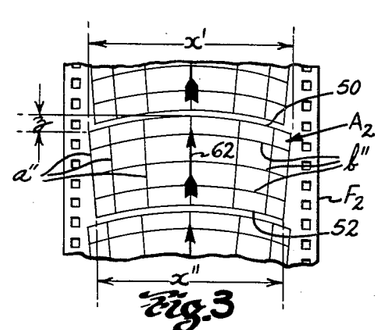
FIG. 3 is a fragmentary diagrammatic face view of a positive film printed from said negative film in accordance with the invention.
Figures 4, 12, 13:
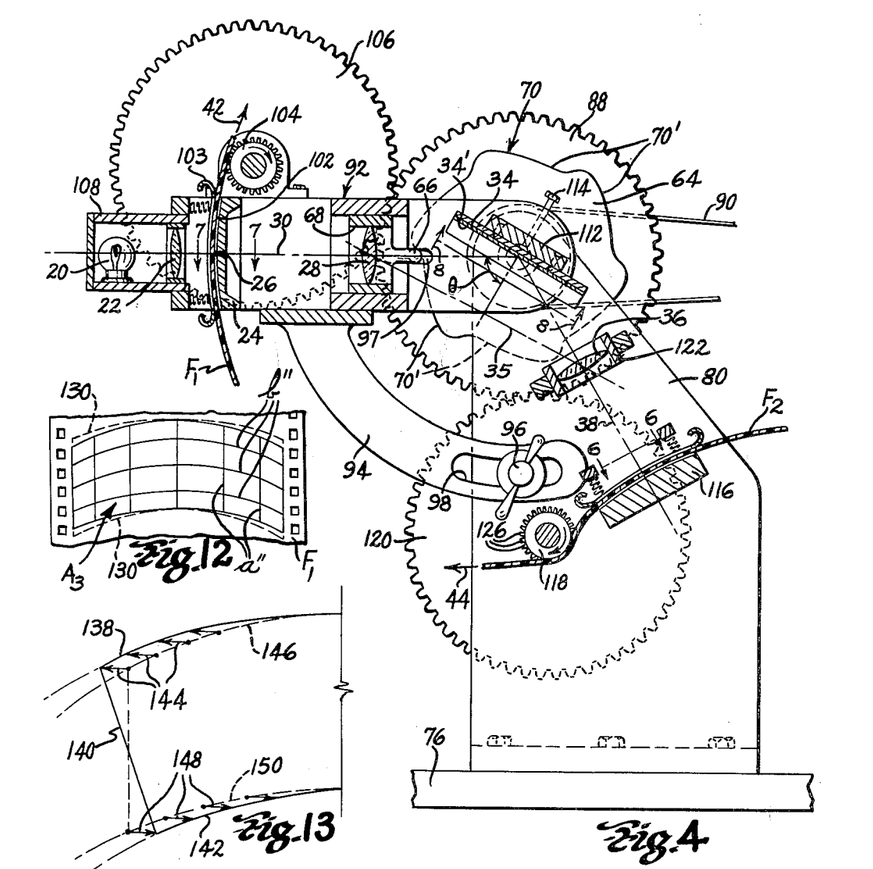
FIG. 4 is a side elevational view partially in cross-section of a film printer wherein the basic elements of the system of the invention are shown diagrammatically along with means to operate the same.
FIGS. 12, 13 and 14 are diagrammatic illustrations of the results of a modified printing procedure performed with apparatus such as shown in FIG. 11.
Figure 5:
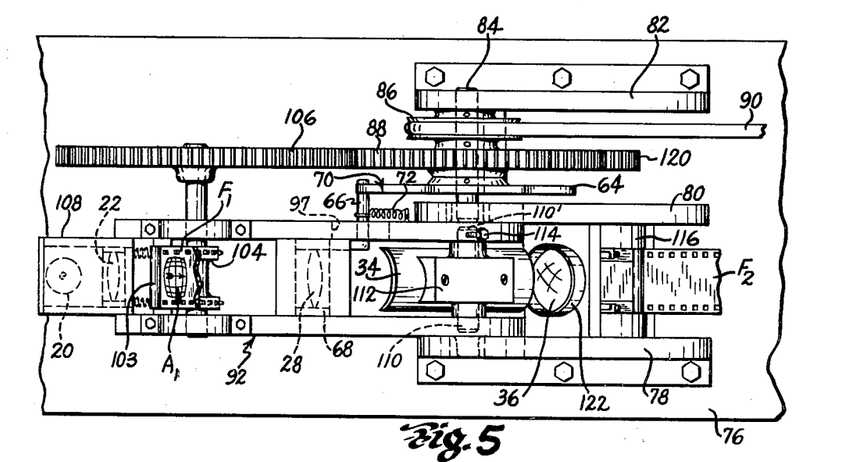
FIG. 5 is a top plan view of the apparatus in FIG. 4.
Figure 8:
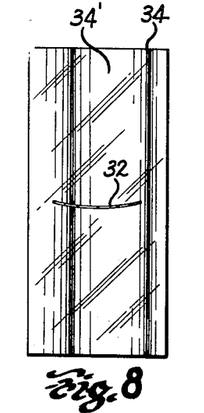
FIG. 8 is a view taken from approximately the location of line 8—8 in FIG. 4 looking in the direction of the arrows.

Referring to the drawings wherein like characters of reference designate like parts throughout the various views, it will be seen that, as one aspect of the invention, the apparatus of FIGS. 4 and 5 deals only with the introduction of corrective distortions in droop and keystone and the straightening of vertical lines $a'$ (FIG. 2) in producing positive reproductions (see FIG. 3) of the negative picture $A_1$ in FIG. 2, which reproductions are suitable for projection onto cylindrically curved viewing screens of known curvature and from known locations above or below the center line of the screen. In this instance deviations of the lines $b'$ in FIG. 2 from true horizontal will, as in most common cases, be considered to be negligible and not noticeable in the resultant picture image which is projected upon the screen for viewing purposes as shown in the O'Brien Patent No. 2,792,746. Since, in wide angle photography, the individual pictures or frames, as they are referred to, are relatively wide but generally quite short in height, corrections for horizontal barrel distortions are usually only necessary in extreme cases. However, means and method for dealing with horizontal barrel distortions along with the above-mentioned vertical straightening, droop and keystone corrections will be discussed hereinafter. In FIGS. 4 and 5 the apparatus comprises, basically, a source of illumination 20, a condensing lens or suitable system 22 positioned in the path of the light emanating from said source of illumination, and a film supporting shoe 24 having a horizontal slit 26 therein through which the light is directed by said condensing lens 22. The shoe 24 is adapted to support a negative film $F_1$ in a given plane and in superimposed relation with the slit 26. An objective system or lens 28 is positioned in the path 30 of the light rays which are directed by the condensing lens 22 to said objective 28 and the objective 28 is adapted to focus a slit image shown by dot-dash outline 32 in FIG. 8 of the film $F_1$ upon a concavely cylindrically curved field mirror 34. Another objective system or lens 36 is positioned in the path of the reflected rays 38 coming from said mirror image 32 and is adapted to receive substantially all of said rays and focus the same onto a positive film $F_2$, as diagrammatically illustrated at 40 in FIG. 6. It is particularly pointed out that both the negative film $F_1$ and the positive film $F_2$, in the transverse directions thereof, are flat and that the slit image 32 as reflected by the curved field mirror 34 is automatically curved by the mirror and consequently provided with a curvature or droop correction depending upon the extent and shape of the curvature of said mirror 34 and the angle of the light rays 30 which approach and impinge thereon.

During the printing operation wherein the slit image size ratio from the positive film $F_2$ to the negative film $F_1$, is 1 to 1, the negative film $F_1$ and the positive film $F_2$ are moved at substantially equal speeds of travel in the directions indicated by the respective arrows 42 and 44 by means of the apparatus shown in FIGS. 4 and 5 and which will be described in detail hereinafter. However, if the slit image size ratios depart from 1 to 1, the ratio of the speeds of travel of the respective films is, accordingly, altered by rearrangement of the apparatus of FIGS. 4 and 5 as will also be set forth in the detailed description which follows. For example, if the slit image as produced on the positive film $F_2$ is to be reduced in size by a ratio of 2 to 1 with respect to the slit image size on the negative film $F_1$, the speed of travel of the positive film $F_2$ with respect to the speed of travel of the negative film $F_1$ will be reduced by the same ratio.

The objective 28 is designed to have controlled optical characteristics such that, at its image position (the position of the slit image 32 on the field mirror 34) its curvature of field will substantially match and be coincident with the curvature of the mirror surface 34'. In this way, the portion of the film $F_1$ which is superimposed over the slit 26 and is located substantially at the object plane of the objective 28 is imaged as illustrated by 32 in FIG. 8 upon the mirror surface 34' (the image plane of the objective 28) by the objective 28 in substantially perfect focus throughout all parts of its length. That is, marginal portions of the slit image 32 will be substantially equally as well focused upon the mirror surface 34 as will the intermediate portions thereof and vice-versa.

The mirror 34 has been referred to hereinabove as a field mirror for the reason that its function in the system of the invention is analogous in certain respects to that of a conventional field lens. In the present case, the mirror 34 is placed between the objectives 28 and 36 along the optical path of the system at approximately the location of the image plane of the first objective 28 which is also the object plane of the objective 36. In this way the second objective 36 which is designed to have a known controlled focal length and consequently known object and image distances, is placed in the optical path of the system a distance from the mirror 34 substantially equal to its object distance so as to receive substantially all light from the image 32 whereby said light will then be imaged in focus upon the flat positive film $F_2$. The film $F_2$ is, of course, located at the image plane of the objective 36 or at a distance therefrom equal to its image distance. The objective 36 is designed to have a substantially flat field at its image plane which is coincident with the surface of the film $F_2$. Thus, in reimaging the slit image 32 upon the flat film $F_2$, the flat field of the objective 36 will render all parts of the resultant slit image 40 (see FIG. 6) in focus upon the film $F_2$. When referring herein to the image and object planes of the objectives 28 and 36, the term image plane is intended to mean the position or location where an image is formed by one or the other of the objectives and the term object plane is intended to mean the position or location of a picture or an already-formed image which is to be projected by one or the other of the objectives.

Figure 9:
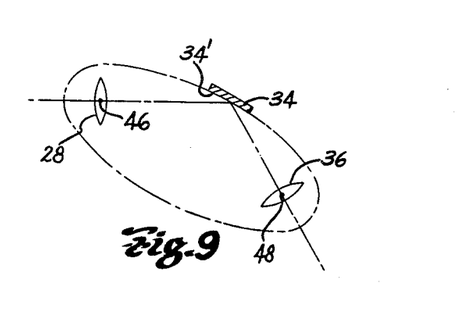
FIG. 9 is a schematic illustration of the arrangement of certain optical elements in the projection system of the invention.

The objective 28, which is adapted to be oscillated somewhat axially for introducing corrective keystone and vertical line straightening distortions in the positive film image, as will be described in detail hereinafter, is located generally at a point between the film $F_1$ and mirror 34 wherein its image and object distances are approximately equal. Thus, with the above arrangement of the two objectives 28 and 36 it can be seen that they are placed upon a line 35 which is the axis of curvature of the mirror surface 34'. The mirror 34', for ease of illustration, has been shown and described hereinabove as being cylindrical. Ideally, however, the mirror surface 34 would be curved to the shape of a portion of an ellipsoid such as diagrammatically illustrated by dot-dash outline in FIG. 9 whose foci 46 and 48 are positioned upon the optical or projection axis of the system, it can be seen that by placing the objectives 28 and 36 at the positions of said foci as shown diagrammatically in FIG. 9, all light passing through the objective 28 will, upon striking the mirror surface 34', be reflected into and through the objective 36 for the reason that in the geometrical configuration of an ellipsoid all light passing through one of its foci and striking any portion of the inner surface of the ellipsoid (said surface being reflective) will inherently be redirected through the other focus.

In this invention, the light used to print an image on the positive film $F_2$ is in the form of a narrow slit image 32 having its long dimension extending generally transversely across the mirror 34. The slit image 32 has a width of approximately only from ¼ to 1 millimeter and because of the narrowness of the slit image 32, the curvature of the mirror 34 in the direction of its longitudinal axis is of only secondary and little importance while the curvature of the mirror along its transverse meridian should be relatively accurately controlled in accordance with the image distance of the objective 36 to cause marginal and all other light rays forming the elongated slit image 32 to converge into and be received by the objective 36. Thus, a close approximation of an ellipsoidal reflecting surface is sufficient for all practical purposes and can be had by providing a toric surface on the mirror 34 which may be formed by known optical methods and which is provided with a curvature along its longest axis such as to approximate the long curve of an ellipsoid of the character diagrammatically illustrated in FIG. 9 and a transverse curvature accurately controlled to substantially match the short or transverse curvature of the ellipsoid so that all light at the opposite edges and intermediate portions of the elongated slit image 32 will be redirected by the mirror 34 into the objective 36. This short or transverse curvature of the mirror and the image distance of the objective 36 are further controlled to introduce a desired droop correction into the picture image formed upon the positive film in a manner to be described in detail shortly.

Actually, in view of the fact that the extreme narrowness of the slit image 32 which is about ¼ to 1 millimeter causes only a very small portion of the length of the surface along the long axis of the mirror 34 to be illuminated and the curvature of the mirror 34 in the direction of said long axis therefore plays only a small part in directing light into the objective 36, it has been found that a plane cylindrical mirror 34 properly curved in its transverse meridian in accordance with the image distance between it and the objective 36 and the droop or curvature desired of the image 40 on film $F_2$ is quite adequate for the purpose of this invention.

It should be understood that for a minimum loss of illumination in transfer of the slit image 32 from the mirror 34 to the film $F_2$, an ellipsoidal or, alternatively, a toric surface 34' on the mirror 34 should be used. However, the description hereinafter will, for ease of illustration, refer to the mirror 34 as having a plain cylindrical surface.

It should also be understood that in place of the mirror 34 it would be possible to use an identically shaped projection screen to receive and form the slit image 32 to the required curved shape. In such a case, the objective 36 would function in camera-like fashion to transfer the slit image to the film $F_2$. A projection screen, however, would render the system of the invention extremely inefficient by reason of the fact that in forming an image upon a projection screen, the image forming light is inherently partially diffused therefrom in all directions. It can be seen that because of this diffusion in all directions only a small portion of the total light forming the image 32 would be directed by the screen into the objective 36 which forms the image 40. Thus, by using a projection screen in place of a mirror, the inherent light loss in the system would render it relatively inefficient and inferior to that shown and described hereinabove wherein the mirror 34 having a specularly reflecting surface 34' is used to transfer the image forming light from the objective 28 into the objective 36 with a negligible loss of light and wherein the intensity of the image 40 upon the film $F_2$ will be nearly equal to that of the image 32 at the mirror 34.

Figure 6:
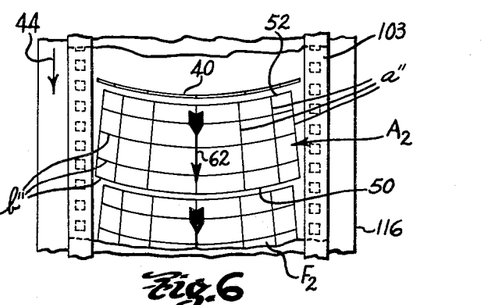
FIG. 6 is a fragmentary view taken from a position indicated by line 6—6 of FIG. 4 looking in the direction indicated by the arrows.
Figure 7:
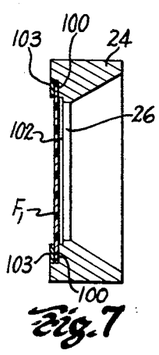
FIG. 7 is a horizontal cross-section taken along line 7—7 in FIG. 4.

Referring more particularly to the introduction of a droop correction in the slit image 40 (FIG. 6) which is projected on the film $F_2$, it is pointed out that while the slit 26 (see FIGS. 4 and 7) is straight and the image of the portion of the film $F_1$ which is projected therethrough is also straight, it is reformed to a curved or cupped shape by the mirror 34 so as to have a controlled amount of droop distortion embodied therein while still being entirely in focus throughout its length as a result of the field curvature of the objective 28 being substantially coincident with and equal in curvature to the reflecting surface 34' of the mirror 34. The extent of said droop distortion will depend upon the degree of transverse surface curvature provided on the mirror 34 and the angle at which the path 30 of light rays strikes the mirror 34. The smaller angles of incidence between the mirror surface 34' and light path 30 and more severe transverse curvatures of mirror surface will introduce the greater cupping or droop corrections in the slit image 32 and vice-versa. This curved slit image 32 is received by the objective 36 and reimaged thereby upon the flat positive film $F_2$ as a second image 40 with the droop distortion embodied therein. It is in this manner that the droop correction is applied to the positive film $F_2$ simultaneously as the negative film $F_1$ is scanned by the slit 26 by movement of the negative film $F_1$ in the direction indicated by the arrow 42. Each negative picture or frame $A'$ is reproduced upon the positive film $F_2$ as a progression of slit images 40 each corrected for droop and which together result in the composite positive picture or frame $A_2$ (see FIGS. 3 and 6). In FIG. 6, it will be seen that each total picture or frame $A_2$ as diagrammatically shown on the film $F_2$ will, as the result of the curving of each of the image components 40 making up the same, have its upper and lower edges 50 and 52 respectively curved in accordance with the curvature imparted to the images 32 by the mirror 34 and angle of projection of the light path 30 onto said mirror. This extent of curving or droop correction which is provided throughout each complete picture or frame $A_2$ is controlled as set forth in detail in the above-mentioned O'Brien Patent No. 2,792,746 in accordance with the angle at which the positive picture is to be subsequently projected onto a curved viewing screen in a theater or the like from a location above the audience or viewing level of the screen. The droop correction, of course, being controlled to be substantially equal and opposite in curvature to the droop in picture shape that would be seen as a result of projection without correction. Projection from higher levels requires more severe droop corrections in the picture frames $A_2$ and projection from lower levels nearer the audience viewing level requires less correction for droop in the picture frames $A_2$. Accordingly, projection straight-on from the audience or viewing level requires no droop correction and projection from below the intended screen viewing level requires a droop correction reversely curved to that shown in FIGS. 3 and 6. Through proper control of the droop correction in the image of the film $F_2$ which is projected onto a curved viewing screen, the top and bottom edges 50 and 52 thereof will appear to the viewer as being horizontal and like the original top and bottom edges 54 and 56 of the object A which was initially photographed.

Referring now to the introduction of corrective distortions relating to the straightening of the vertical lines $a'$ in the negative picture image $A_1$ (FIG. 2) to correct for the above-mentioned barrel distortions which result from photographing the object A with a wide angle type camera lens as set forth in the O'Brien Patent No. 2,792,746, it will be seen that said corrections are accomplished by oscillating the objective 28 axially in controlled amounts as the negative film $F_1$ passes over the slit 26.

In FIG. 2, it can be seen that, in order to straighten the side edges and the vertical lines $b'$ in the picture frame $A_1$ as diagrammatically illustrated by the dash lines $c$, the width of the picture $A_1$ must be extended laterally or magnified by progressively differing amounts from top to bottom, the greater amounts of widening being at the top 55 and bottom 60 with no width change along the horizontal center line 57. In so doing, all of the lines $b'$ would become vertical and the picture $A_1$, still embodying the initial horizontal compression of its vertical lines $b'$ would be suitable for projection onto a cylindrically curved screen cupped toward the projection apparatus and the projected image thereof on the screen would appear to be substantially identical to the object A (FIG. 1) provided the picture $A_1$ was projected along an axis straight-on or substantially normal to the screen.

For films which are to be used to project images onto a viewing screen of the above character from positions above or below the viewing level of the screen, keystone corrections along with the straightening of the sides of the picture frames are required as mentioned above. The direction of keystoning for film images which are projected from above the said viewing level would be such as to render the top edge 50 of the picture frame $A_2$ wider than its bottom edge 52. Arrows 62 are shown in FIGS. 1, 2, 3 and 6 to distinguish the top from the bottom of the pictures. In all cases, the arrows 62 point to the top edge of the picture image which makes up the frames $A_1$ or $A_2$.

If for some reason it was necessary to project a picture image of the above character upwardly onto a viewing screen from below the viewing level thereof, the keystoning would naturally be reversed from that shown in FIGS. 3 and 6 to make the top edge 50 of the picture frame $A_2$ narrower than the bottom edge 52 thereof. Keystoning straightens the edges of a picture projected angularly upon viewing screens of the type mentioned above by compensating for the differences in projection distances from the projector's objective to the respective top and bottom edges of the picture image shown and described in detail in the O'Brien Patent No. 2,792,746.

It will become readily apparent hereinafter that films having keystoning and droop corrections opposite to that shown in FIGS. 3 and 6 could be made simply by inverting the negative film $F_1$ or feeding the film upwardly in the direction of arrow 42 with its image $A_1$ inverted or so that the picture $A_1$ passes over the slit 26 from bottom 60 to top 58.

The following description will relate to the producing of keystone, droop and straightening corrections such as illustrated in FIGS. 3 and 6.

The corrective distortions for vertical straightening of lines $b'$ and keystone which are introduced simultaneously into the images 40 projected onto the positive film $F_2$ in printing the picture frames $A_2$ are accomplished by oscillation of the objective 28 axially toward and away from the mirror 34 through the use of a rotatable cam 64 and a cam follower 66 fixed to a slidable supporting lens cell 68 in which the objective 28 is mounted. The cam 64 has an edge 70 against which the follower 66 is held by a spring 72 (see FIG. 5) and this edge 70 of the cam is so shaped as to produce the extent and rate of oscillation which is required of the objective 28 to introduce the above-mentioned keystone and straightening corrections in each of the resultant picture frames $A_2$ on the film $F_2$.

As the negative film $F_1$ is moved upwardly (as shown by arrow 42 in FIGS. 2 and 4) over the slit 26, the slit images 32 which are progressively formed on the mirror 34 by the objective 28, are, at the same time, progressively changed in magnification or length by the objective 28. This change begins from the top edge 58 of the negative picture $A_1$ where the greatest magnification of the image 32 is produced by arranging the cam 64 so as to move the objective 28 to its closest position toward the film $F_1$. This magnification at the top edge 58 is of an amount sufficient to displace the top of the vertically curved lines $a'$ outwardly by an amount sufficient to straighten said lines and to further displace the said lines $a'$ outwardly by an amount to introduce the magnification required for the keystone correction. As the film $F_1$ passes upwardly in the direction of arrow 42, the picture $A_1$ is effectively scanned downwardly by the slit 26 and the objective 28 is gradually moved toward the mirror 34 or away from the film $F_1$ to progressively minify the size of the image 32 by controlled amounts determined by the shape of the cam surface 70. It is pointed out that the shape of the cam surface 70 is so controlled as to cause the movement of the objective to be such as to introduce the correction required to straighten the vertical lines $a'$ and simultaneously introduce the required keystone correction in the resultant picture $A_2$ shown in FIG. 6.

It is pointed out that since the slit image 32 is always very thin preferably with a width dimension of only from approximately ¼ to 1 millimeter, magnification of minification in the vertical meridians or across the width of the slit image is negligible and does not noticeably affect the overall image definition or resolution in the positive printed image $A_2$ while the said magnification and minification does appreciably change the length dimension of the slit, and produce the desired straightening and keystoning effects.

It is further pointed out that oscillation of the objective 28 does not appreciably affect the focus of the image 32 on the mirror 34 for the reason that the objective 28 is placed in the system so as to be at or near a point midway between the film $F_1$ (its object plane) and the mirror 34 (its image plane) at all times. That is, its object distance is always equal to or nearly equal to its image distance and oscillation takes place in substantially equal amounts to each side of said mid point. The axial movement of the objective 28 from one side or the other of a mid point between the total distance from its object plane to its image plane during the above-mentioned oscillation is rather slight.

Figure 10:
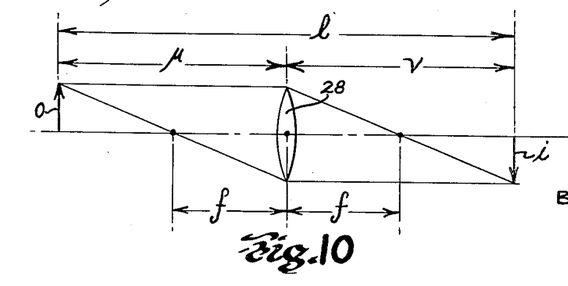
FIG. 10 is a schematic illustration of the function of an optical projection element in the system of the invention.

In order to point out more clearly why the oscillation of the objective 28 will not result in any appreciable out-of-focus condition of the image 32, reference is made to FIG. 10 which schematically shows the objective 28 placed midway between its object plane $o$ and its image plane $i$ with an object distance $\mu$, an image distance $\nu$ and focal length $f$. From the well known relationship of $$\frac{1}{\mu}+\frac{1}{\nu}=\frac{1}{f} \text{ or } \nu=\frac{\mu f}{\mu-f}$$

it can be seen that for a fixed value $f$ of, for example 100 millimeters, $\mu$ and $\nu$ will be equal when the image distance $\mu$ equals 200 millimeters. The total object to image distance $l$ will be 400 millimeters. If $\mu$ is changed to 204 millimeters, $\nu$ will be changed to 196.16 millimeters and $l$ will equal 400.16 millimeters. Likewise, if $\mu$ is changed to 196.16 millimeters, $\nu$ will be changed to 204 millimeters and $l$ will again equal 400.16 millimeters. Thus, it can be seen that for an overall oscillation of 8 millimeters the maximum deviation of the image plane $i$ from perfect coincidence with the mirror surface $34'$ will be only .16 millimeters or about 2% of the total motion of the objective. This, obviously, will not amount to an appreciable out-of-focus condition of the image 32 on the fixed mirror 34. This out-of-focus condition can, and would preferably be further minimized in the design of the system by designing the objective 28 so as to have a perfect, in-focus object to image distance $l$ equal to 400.08 millimeters and thus for an overall oscillation of 8 millimeters the maximum change in $l$ would be .08 millimeters or only 1% of the total lens motion. The above figures are arbitrary and have only been given for illustration purposes; the effect, however, would be the same for all projection systems wherein the objective is located midway between its object and image planes.

Referring now in more detail to the construction and operation of the apparatus shown in FIGS. 4 and 5, it will be seen that there is provided a base 76 upon which three upstanding main supporting brackets 78, 80 and 82 (see FIG. 5) are mounted. Journaled in the uppermost ends of the brackets 80 and 82 is a rotatable shaft 84 upon which is mounted a pulley 86, a main drive gear 88 and the above-mentioned cam 64 all disposed between the brackets 80 and 82 and locked with set screws and/or keyed to the shaft 84 so as to rotate in unison therewith. The shaft 84 is driven by a belt 90 placed around the pulley 86 and which, in turn, is driven by a conventional electric motor or the like (not shown) at a speed selected to ultimately move the films $F_1$ and $F_2$ at a desired rate for printing.

A laterally extending bifurcated supporting arm 92 is mounted between the brackets 78 and 80 in such manner as to pivot about the axis of the shaft 84. In order to hold the arm 92 fixed in a desired pivotally oriented relation with the brackets 78 and 80, a depending arcuately shaped part 94 is provided on the under side of the arm 92. The part 94 is connected to the main supporting bracket 80 adjacent its terminal end by a releasable thumb screw or the like 96 which extends through an arcuate slot 98 in the part 94. When the screw 96 is loosened the arm 92 is allowed to be pivoted about an axis coincident with that of the shaft 84 and, as it will become apparent hereinafter, this pivotal adjustment of the arm 92 is used to set the apparatus in such a way as to control the amount of droop correction introduced into the slit image 32 on the mirror 34. The lens cells 68 is slidably mounted in the bifurcation of the arm 92 as shown in FIGS. 4 and 5 and its cam follower 66 extends through a slot 97 so as to engage the cam 64 and thereby operate to oscillate the objective 28.

The film supporting shoe 24 is mounted upon the arm 92 within the bifurcated portion thereof and embodies a film guideway 100 (see FIG. 7) through which the film $F_1$ passes. The guideway 100 is recessed at 102 to avoid scratching of the picture area of the film and a resilient spring band or film holding member 103 is provided to hold the film $F_1$ in the guideway 100 and to impart a desired uniform drag on the edges of the film to keep it flat when drawn across the slit 26.

A drive sprocket 104 mounted on the arm 92 is provided to pull the film $F_1$ across the shoe 24 and the sprocket 104 is driven by a gear 106 arranged to mesh with and be driven by the gear 88. The light source 20 and condenser lens system 22 are mounted within an enclosure 108 at the end of the arm 92 and in such a manner as to illuminate the portion of the film $F_2$ which passes over the slit 26 as described hereinabove.

In the space between the bifurcated ends of the arm 92 which are pivotally mounted to the brackets 78 and 80 is a supporting block 112 for the mirror 34. The block 112 is arranged to have trunnions 110 and 110' pivotally connected to the arm 92 in such manner as to extend the mirror across the space between its bifurcated end. This permits the mirror 34 to pivot about the pivotal axis of the arm 92. In this way, adjustment of the mirror 34 relative to the projection axis of the system can be accomplished without altering the location of the image point of the objective 28 which lies on the axis about which the arm 92 may be pivoted. A set screw 114 is provided to clamp the mirror supporting block in a desired angularly adjusted position.

The positive film $F_2$ which receives the image 40 (FIG. 6) is guided over a shoe 116 which is identical to the shoe 24 with the exception that it is not provided with a light slit but, instead, is solid. The shoe 116, like shoe 24, holds the film $F_2$ flat in its transverse meridian and is recessed to prevent scratching of the picture area of the film. That is, only the side edge portions of the film $F_2$ fit against and engage the shoe 116 in the manner shown and described above with relation to the shoe 24. A sprocket 118 is used to draw the film $F_2$ over the shoe 116 in the direction of arrow 44. The sprocket is driven by a gear 120 which meshes with and is driven by the gear 88.

The objective 36 is coaxially aligned with the projection axis of the system and is held fixedly in a lens cell 122 supported in between and by the brackets 78 and 80.

In the arrangement of the apparatus shown in FIGS. 4 and 5, the gears 88, 106 and 120 are all of the same pitch diameter and the sprockets 104 and 118 are identical in all respects so that rotation of the gear 88 will cause the films $F_1$ and $F_2$ to be driven or moved along their respective shoes at equal rates. The optices of the projection system is also designed to provide unit magnification so that the apparatus, as so constructed, provides a 1 to 1 ratio of speeds of the films and a 1 to 1 ratio of size between the negative picture image $A_1$ and the positive picture image $A_2$.

It will be noted in FIG. 4 that the cam 64 has been shown for purposes of illustration as having six camming areas $70'$ around its edges 70, each one of which functions to move the objective 28 an amount and in directions controlled in accordance with the contours of said areas $70'$ so as to cause the resultant overall picture image $A_2$ to take on the desired keystoned shape illustrated in FIGS.

3 and 6. That is, each cam surface 70' operates to properly adjust the objective 28 for the printing of one complete picture image or frame $A_2$ and the intermediate relatively steep rises between the surfaces 70' function to reposition the objective during the interval between the time when the bottom edge 60 of one frame $A_1$ of the film $F_1$ leaves the slit 26 and the top edge 58 of the next succeeding frame reaches the slit 26. By reference to the term "repositioning" of the objective, it is meant that between frames, the objective is moved back to its position closest to the film $F_1$ so as to begin projecting the uppermost part of the next frame as a relatively highly magnified slit image 32. The surface 70' then gradually moves the objective toward the mirror 34 to controllably minimize the size of the slit image 32 as the frame $A_1$ passes by the slit 26.

From the above, it can be seen that with sprockets 104 and 118 of identical sizes and driven at a 1 to 1 speed ratio, films $F_1$ and $F_2$ having five sprocket holes per each picture frame along their length will be rotated at a rate of six picture frames ($A_1$ or $A_2$) per revolution of the sprockets when the sprockets are each provided with 30 teeth 126. Thus, the cam 64 being rotated at the same rate as the sprockets and having six camming surfaces 70' will function to adjust the objective 28 proper amounts in timed sequence with the frame repetition rate so as to introduce the required distortion corrections into each printed picture image $A_2$.

It should be understood, however, that various other gearing arrangements may be used to produce the 1 to 1 rotational rate of the sprockets 104 and 118 and, accordingly, by selective gearing, the cam 64 may be arranged to have more or less camming surfaces 70' than illustrated in the drawings while still operating to properly adjust the objective in accordance with the picture frame repetition rate. Furthermore, the objectives 28 and 36 may be designed to produce printed picture frames $A_2$ on film $F_2$ which are larger or smaller than the negative picture frames $A_1$ on film $F_1$. In this way, films of larger sizes may be printed from smaller negative films or vice-versa. In such a case, the drive ratio between sprockets would be adjusted by selective gearing to accommodate for the differences in film sizes.

It is pointed out that with applicant's arrangement for printing, the film advancing sprocket 118 may be placed in very close relation with the shoe 116 and, actually, its position with respect to the shoe 116 may be such as to duplicate the sprocket position of the projector intended to use the film with respect to the film gate therein. By reason of the fact that it is possible to position the film sprocket 118 in close relation with the shoe 116, a minimum amount of film will span said sprocket and shoe and tension or drag on the film may be easily uniformly controlled to minimize stretching. Wide expanses of film between a shoe and drive sprocket subject the film to stretching and in addition to altering image shape, stretching alters the spacing of sprocket holes which, for obvious reasons, is detrimental to the film.

Figures 11, 14:
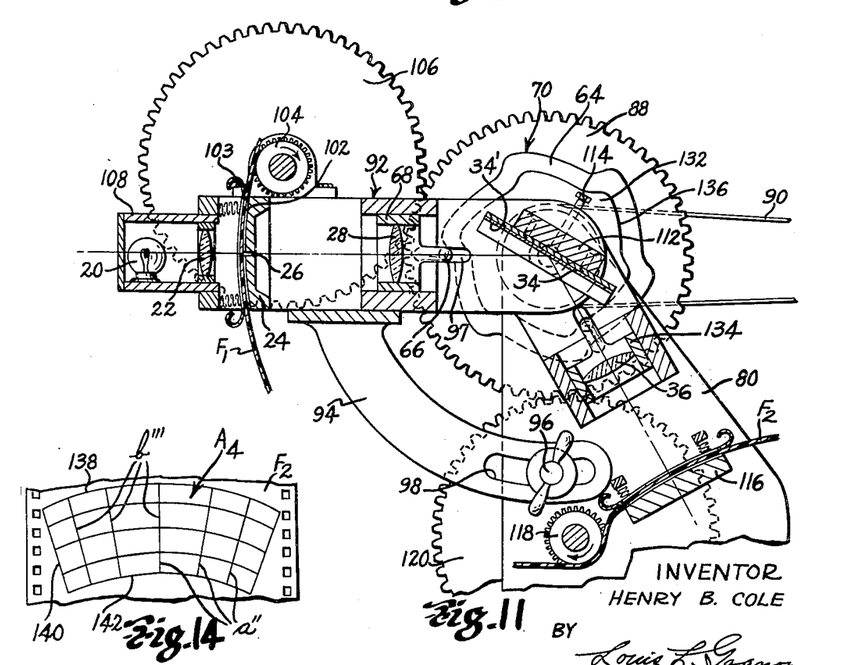
FIG. 11 is a diagrammatic illustration of a modification in apparatus.

While it has been stated above that the objective 28 may be oscillated to introduce certain corrective distortions in the image as produced on the positive film, it is to be understood that the objective 28 may be held stationary and the objective 36 might be oscillated to introduce similar corrective distortions. It might also be desirable, in order to obtain certain similar distortional corrections to oscillate both of the lens objectives 28 and 36 with controlled related ratios in speed as shown in FIG. 11 and if it should be desirable to introduce overall lateral compressions in the image as produced on the positive film, one or the other or both of said objectives 28 and 36 may possess anamorphic characteristics.

It should now be apparent that droop corrections are introduced as the result of and by controlling the transverse curvature of the mirror cooperatively in accordance with the angle at which the image 32 is projected onto the mirror 34. Thus, for a change in droop, the arm 92 of the apparatus in FIGS. 4 and 5 would be adjusted by pivoting about its connection with brackets 78 and 80 and the mirror 34 would be adjusted by pivoting about its trunnions 110 and 110' to a position where a normal to its surface 34' would bisect the included angle between the intersecting optical axes of the respective objectives 28 and 36. For appreciable changes in droop corrections, different mirrors having different precontrolled curvatures calculated in accordance with the angle of projection thereonto would be used. Also the objective 28 would be replaced by one designed to have a field curvature matching the curvature of whatever mirror was used. All of these factors including the angle of projection, curvature of mirror and design of the objective 28 to produce an image such as 32 having a desired curved shape involve design procedures commonly known and used in the field of optics.

The introduction of the straightening effect on the vertical lines $a'$ of the picture images $A_1$ and the introduction of keystone is accomplished by proper oscillation of the objective 28.

By way of example, for a negative picture image $A_1$ having a width $x$ of 50 millimeters and height $y$ of 22 millimeters (FIG. 2) which is to be printed as a positive picture image $A_2$ (FIG. 3) having a width $x'$ at the top of 52 millimeters and a width $x''$ at the bottom of 48 millimeters with a droop $z$ of 4 millimeters, the following setup in the apparatus of FIGS. 4 and 5 would be used:

The distance from the film $F_1$ to the mirror 34 would be approximately 400 millimeters. The radius of the transverse curvature of the mirror 34 would be approximately 125 millimeters. The angle $\theta$ (see FIG. 4) would be approximately 51°24' and all other parts of the apparatus would be designed as described hereinabove.

Referring now to FIGS. 11 through 14, it can be seen that by means of the modified apparatus shown in FIG. 11 a correction to straighten or minimize barrel distortion in the horizontal lines $b'$ of the picture $A_1$ can be accomplished.

In FIG. 12 there is shown what would be the result of printing a positive image of the negative image $A_1$ without correcting for horizontal barrel effect and keystone. That is, the image $A_3$ in FIG. 12 has been provided only with a droop correction and a correction to straighten its vertical lines $b''$.

The dashed outline 130 around the picture $A_3$ indicates the correction required to straighten or substantially remove horizontal barrel effect so that when the picture $A_3$ is projected upon a curved viewing screen as discussed above, its horizontal lines will appear truly horizontal to a viewer looking straight on.

Using the apparatus of FIG. 11 which is identical to that shown and described with relation to FIGS. 4 and 5 with the exception that the objective 36 is oscillated simultaneously with the objective 28, only a droop correction and vertical straightening of the lines $b''$ is introduced into the image 32 produced upon the mirror 34. At this time, no keystone correction is provided. The above described cam is arranged to move the objective 28 so as to introduce only a straightening of lines $b''$ and not produce keystoning.

The picture $A_3$ is then projected upon the film $F_2$, a slit at a time as described above by the objective 36 which, in this case, is operated by a second cam 132 to introduce the keystone correction and straightening of the horizontal lines $b'''$ in the final picture image $A_4$ (FIG. 14).

Before describing the effect produced by oscillating the objective 36, it is first pointed out that its supporting cell 134 and associated oscillating mechanism including the cam 132 are identical in operation and construction to that described hereinabove with relation to the objective 28 and cam 64 in FIGS. 4 and 5 and for this reason, repetition of this part of the disclosure is not believed necessary. In the case of FIG. 11, the cam surface 136 is, however, preshaped to simultaneously produce the keystoning and horizontal barrel straightening while the surface 70 of the cam 64 is preshaped to produce only straightening of the vertical lines $a''$ of the picture $A_3$ (FIG. 12).

In producing the keystoning in the picture $A_4$, the top half of the picture $A_3$ is magnified and the bottom half is minified by magnifying and demagnifying the progression of slit images that form the resultant picture $A_4$.

In FIG. 13, this final effect of magnification and minification is illustrated by the solid lines 138, 140 and 142 which outline approximately one-half or one side of the final picture $A_4$. The dash lines show the outline of the picture $A_3$ before magnification at the top and minification at the bottom thereof. A progressive change in magnification of each slit image which forms the picture $A_4$ will bring about the effect illustrated in FIG. 13.

Magnification of the picture image along its top line 138 will broaden the picture laterally or sidewise as shown by the various arrows 144 of equal length to flatten the original top edge of the picture shown by dash line 146. In a similar fashion, progressive minification of the lower half of the picture image will shorten the picture width as indicated by the arrows 148 of equal lengths to steepen the curve 142 from its original shape shown by dash line 150. The overall effect is, of course, proportionately the same throughout the entire picture area. The arrows 144 and 148 diagrammatically illustrate the amount of magnification and demagnification used at the respective top and bottom slit images which form the resultant picture $A_4$. Between the top and bottom of the picture $A_4$, the slit images are magnified and demagnified progressively lesser amounts.

In this way, the top 138 and bottom 142 of the picture $A_4$ take on the shape shown by the dashed outline in FIG. 12 which, as it was said above, is the shape required to correct for horizontal barrel distortion.

The picture $A_4$ on film $F_2$ in FIG. 14 is then fully corrected for vertical and horizontal straightening, keystone and droop.

It should be understood that, excluding the droop correction which is controlled by the curvature of the mirror 34 and angle of projection, all other corrections for keystone and straightening either horizontally or vertically may be partially introduced by one of the objectives 28 or 36 and further brought out to a desired extent by the other objective by proper design of the objectives themselves and the operating surfaces 70 or 136 of their respective cams 64 or 132. That is, either one or the other of the objectives may be used to introduce a certain straightening or keystone correction or the two objectives together may be operated to each introduce a part of the required straightening or keystoning with the combined effect or result of full correction.

From the foregoing, it will be seen that novel means and method have been provided for accomplishing all of the objects and advantages of the invention. Nevertheless, it should be understood that various changes in the details of construction, arrangement of parts and steps in the method may be made by those skilled in the art without departing from the spirit of the invention as expressed in the accompanying claims and the invention, therefore, is not to be limited to the exact matters shown and described as only preferred matters have been given by way of illustration.

Having described my invention, I claim:

1. The method of printing a picture from a first film onto a second film and simultaneously introducing controlled distortions in the resultant picture on said second film comprising supporting and moving said first and second films respectively at controlled rates longitudinally in spaced relation with each other, causing said moving films to be maintained substantially flat in transverse meridians thereof at the locations of the picture exposing and picture receiving areas of the respective films, continuously producing transversely disposed elongated slit images of successive portions of said picture on said moving first film at said picture exposing area of said first film, projecting said slit images onto said picture receiving area of said moving second film to expose said picture receiving area of said second film progressively to said succession of slit images and to form by the composite of said slit images a picture on said second film simultaneously causing said slit images to each become longitudinally curved during projection between said films and prior to incidence upon said second film by amounts controlled in accordance with certain curved distortional characteristics desired in said picture formed on said second film and further simultaneously progressively altering the size of said slit images different amounts during said projection thereof to introduce other desired distortional characteristics in said picture formed on said second film.

2. The method of printing a negative picture from a negative film onto a positive film and simultaneously introducing controlled distortions in the resultant picture on said positive film comprising supporting and moving said negative and positive films longitudinally in spaced relation with each other at rates respectively controlled in accordance with the size of the negative picture and the size desired of the picture to be printed on said positive film, causing said moving films to be maintained substantially flat in transverse meridians thereof at the locations of picture exposing and picture receiving areas of the respective negative and positive films, continuously producing transversely disposed elongated slit images of successive portions of said negative picture on said moving negative film at said picture exposing area thereof, projecting said slit images onto said picture receiving area of said moving positive film to expose said picture receiving area of said positive film progressively to said succession of slit images and to form by the composite of said slit images the picture on said positive film, simultaneously causing said slit images to each become longitudinally curved during projection between said films and prior to incidence upon said positive film by amounts controlled in accordance with certain curved distortional characteristics desired in said picture formed on said positive film and further simultaneously progressively altering the size of said slit images different amounts during said projection thereof to introduce other desired distortional characteristics in said picture formed on said positive film.

3. The method of printing a picture from a first film onto a second film and simultaneously introducing controlled droop and keystone distortions in the resultant picture on said second film comprising supporting and moving said first and second films respectively at controlled rates longitudinally in spaced relation with each other, causing said moving films to be maintained substantially flat in transverse meridians thereof at the locations of picture exposing and picture receiving areas of the respective films, continuously producing transversely disposed elongated slit images of successive portions of said picture on said moving first film at said picture exposing area of said first film, projecting said slit images onto said picture receiving area of said moving second film to expose said picture receiving area of said second film progressively to said succession of slit images and to form by the composite of said slit images a picture on said second film, simultaneously causing said slit images to each become longitudinally curved during projection between said films and prior to incidence upon said second film by amounts in accordance with the extent of droop distortion desired in said picture on said second film and further simultaneously progressively altering the size of said slit images different amounts during said projection thereof to introduce said keystone distortion in said picture formed on said second film.

4. Apparatus of the character described comprising an optical projection system embodying first and second objectives spaced from each other along a projection axis with the image plane of said first objective substantially coincident with the object plane of said second objective at a point therebetween on said projection axis, a mirror between said objectives having its reflecting surface substantially coincident with said point on said projection axis and concavely curved in a direction transversely of said projection axis, said mirror being further so angularly disposed and concavely curved as to receive and redirect substantially all light from said first objective into said second objective, means for moving a negative film having a negative picture thereon across said projection axis substantially at the location of the object plane of said first objective, means for moving a positive film across said projection axis substantially at the image plane of said second objective, means for supporting and retaining said negative and positive films substantially flat in their transverse meridians adjacent said projection axis during the movement thereof, said supporting means for said negative film having a slit therethrough arranged to extend transversely across said negative film at the location of said projection axis to expose a correspondingly shaped portion of said negative picture to said first objective, means to illuminate said negative film at said slit to cause a slit image thereof to be formed by said first objective upon said concavely curved surface of said mirror, said slit image being reimaged upon said positive film by said second objective and means functioning cooperatively with the movement of said negative and positive films for simultaneously moving at least one of said objectives controlled amounts along said projection axis as said films are moved thereacross.

5. Apparatus for printing a positive picture on a positive film from a negative picture on a negative film and simultaneously introducing controlled distortions in the resultant positive picture comprising an optical projection system embodying first and second objectives spaced from each other along a projection axis with the image plane of said first objective substantially coincident with the object plane of said second objective at a point therebetween on said projection axis, a mirror between said objectives having its reflecting surface substantially coincident with said point on said projection axis and concavely curved in a direction transversely of said projection axis an amount in accordance with certain distortional characteristics desired in said positive picture, said mirror being further so angularly disposed as to receive and redirect substantially all light from said first objective into said second objective, means for moving said negative film having the negative picture thereon across said projection axis substantially at the location of the object plane of said first objective, means for moving said positive film across said projection axis substantially at the image plane of said second objective, means for supporting and retaining said negative and positive films substantially flat in their transverse meridians adjacent said projection axis during the movement thereof, said supporting means for said negative film having a substantially straight slit therethrough arranged to extend transversely across said negative film adjacent the location of said projection axis to expose a correspondingly shaped portion of said negative picture to said first objective, means to illuminate the area of said negative film adjacent said slit to cause a slit shaped image thereof to be formed by said first objective upon said concavely curved surface of said mirror and distorted to the curved shape of said mirror, said slit image then being reimaged in its curved shape upon said positive film by said second objective and means functioning cooperatively with the movement of said negative and positive films for simultaneously moving at least one of said objectives controlled amounts along said projection axis as said films are moved thereacross to magnify and demagnify the size of said slit image as received by said positive film in accordance with other controlled distortions desired in said positive picture formed on said positive film by said slit image.

6. Apparatus of the character described comprising an optical projection system embodying a first movable and a second fixed objective spaced from each other along a projection axis with the image plane of said first objective in approximate coincidence with the object plane of said second objective at a point therebetween on said projection axis, a mirror between said objectives having its reflecting surface substantially coincident with said point on said projection axis and concavely curved in a direction transversely of said projection axis, said mirror being further so angularly disposed and concavely curved as to receive and redirect substantially all light from said first objective into said second objective, means for moving a negative film having a negative picture thereon across said projection axis substantially at the location of the object plane of said first objective, means for moving a positive film across said projection axis substantially at the image plane of said second objective, means for supporting and retaining said negative and positive films substantially flat in their transverse meridians adjacent said projection axis during the movement thereof, said supporting means for said negative film having a slit therethrough arranged to extend transversely across said negative film at the location of said projection axis to expose a correspondingly shaped portion of said negative picture to said first objective, means to illuminate said negative film at said slit to cause a slit image thereof to be formed by said first objective upon said concavely curved surface of said mirror, said slit image being reimaged upon said positive film by said second objective and means functioning cooperatively with the movement of said negative and positive films for simultaneously moving said first objective controlled amounts along said projection axis toward and away from said mirror as said films are moved across said projection axis to magnify and minify the size of said slit image as received by said positive film.

7. Apparatus of the character described comprising an optical projection system embodying a first fixed and a second movable objective spaced from each other along a projection axis with the image plane of said first objective in approximate coincidence with the object plane of said second objective at a point therebetween on said projection axis, a mirror between said objectives having its reflecting surface substantially coincident with said point on said projection axis and concavely curved in a direction transversely of said projection axis, said mirror being further so angularly disposed and concavely curved as to receive and redirect substantially all light from said first objective into said second objective, means for moving a negative film having a negative picture thereon across said projection axis substantially at the location of the object plane of said first objective, means for moving a positive film across said projection axis substantially at the image plane of said second objective, means for supporting and retaining said negative and positive films substantially flat in their transverse meridians adjacent said projection axis during the movement thereof, said supporting means for said negative film having a slit therethrough arranged to extend transversely across said negative film at the location of said projection axis to expose a correspondingly shaped portion of said negative picture to said first objective, means to illuminate said negative film at said slit to cause a slit image thereof to be formed by said first objective upon said concavely curved surface of said mirror, said slit image being reimaged upon said positive film by said second objective and means functioning cooperatively with the movement of said negative and positive films for simultaneously moving said second objective controlled amounts along said projection axis toward and away from said mirror as said films are moved across said projection axis to magnify and minify the size of said slit image as received by said positive film.

References Cited in the file of this patent

UNITED STATES PATENTS

| | | |
|---|---|---|
| 1,651,574 | Beechlyn | Dec. 6, 1927 |
| 1,853,072 | Morioka | Apr. 12, 1932 |
| 1,906,973 | Kingsbury | May 2, 1933 |
| 2,081,299 | Hill | May 25, 1937 |
| 2,299,682 | Conant | Oct. 20, 1942 |
| 2,792,746 | O'Brien | May 21, 1957 |

FOREIGN PATENTS

| | | |
|---|---|---|
| 299,734 | Great Britain | Oct. 29, 1928 |